(12) United States Patent
Weinl et al.

(10) Patent No.: US 10,867,734 B2
(45) Date of Patent: Dec. 15, 2020

(54) INDUCTIVE LOAD CONTROL

(71) Applicant: ZF Friedrichshafen AG, Friedrichshafen (DE)

(72) Inventors: Florian Weinl, Bodolz (DE); Christoph Stritt, Bad Waldsee (DE); Ulrich Schmidt, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 560 days.

(21) Appl. No.: 15/785,715

(22) Filed: Oct. 17, 2017

(65) Prior Publication Data
US 2018/0108467 A1    Apr. 19, 2018

(30) Foreign Application Priority Data
Oct. 19, 2016    (DE) .......................... 10 2016 220 445

(51) Int. Cl.
*H02M 3/158* (2006.01)
*H01F 7/18* (2006.01)
*H02M 5/293* (2006.01)
*H02M 3/155* (2006.01)
*H02M 1/00* (2006.01)
*F16D 25/00* (2006.01)
*F16D 48/06* (2006.01)
*F16H 61/02* (2006.01)
*F16K 31/06* (2006.01)

(52) U.S. Cl.
CPC .......... *H01F 7/1877* (2013.01); *H02M 3/158* (2013.01); *H02M 5/293* (2013.01); *F16D 25/00* (2013.01); *F16D 48/06* (2013.01); *F16D 2500/3028* (2013.01); *F16D 2500/3166* (2013.01); *F16D 2500/7042* (2013.01); *F16H 61/0251* (2013.01); *F16K 31/0675* (2013.01); *H02M 2001/009* (2013.01); *H02M 2003/1555* (2013.01); *H02M 2005/2932* (2013.01)

(58) Field of Classification Search
USPC .......................................................... 361/160
See application file for complete search history.

(56) References Cited

U.S. PATENT DOCUMENTS

| 4,173,031 | A | * | 10/1979 | Leichle | ................... | F02D 41/20 |
| | | | | | | 361/154 |
| 2005/0047053 | A1 | * | 3/2005 | Meyer | ..................... | F02D 41/20 |
| | | | | | | 361/139 |
| 2012/0316755 | A1 | * | 12/2012 | Ibrahim | ................. | F02D 41/20 |
| | | | | | | 701/103 |

FOREIGN PATENT DOCUMENTS

DE    10 2011 114 616 A1    12/2012

* cited by examiner

*Primary Examiner* — Danny Nguyen
(74) *Attorney, Agent, or Firm* — Davis & Bujold PLLC; Michael J. Bujold

(57) ABSTRACT

A plurality of inductive loads (105) are connectable in parallel with one another between first and second terminals (120, 125), to which a controllable voltage (205) is applied. A method (300, 400) for operating the loads (105) includes the steps of detecting (305, 405) the connection of a previously non-energized load (105) between the terminals (120, 125); setting (310, 410, 435) the voltage (205) to a predetermined first value (210), and, after the lapse of a predetermined time interval (315, 415), adjusting the voltage (205) to a predetermined second value (215), with the second value (215) being lower than the first value (210).

10 Claims, 4 Drawing Sheets

INDUCTIVE LOAD CONTROL

This application claims priority from German patent application serial no. 10 2016 220 445.9 filed Oct. 19, 2016.

FIELD OF THE INVENTION

The invention concerns the control of inductive loads. In particular, the invention concerns the control of a plurality of inductive loads which can be connected in parallel with one another to a voltage source.

BACKGROUND OF THE INVENTION

A controllable multi-speed transmission, for example for a truck, comprises a plurality of actuators which are operated by means of compressed air. To control the compressed air switching valves are provided, which are electrically actuated. Each switching valve comprises at least one electric solenoid which, when an electric current flows through it, produces a magnetic field that exerts a force on an armature which controls an associated air valve. The actuators can for example be used to engage or disengage a gear, to actuate a clutch or to activate a group transmission.

For the control of a plurality of shifting elements, usually an electrical or electronic assembly is provided. To ensure a good response time of a control element but at the same time avoid overloading the solenoid with current, a voltage to which the solenoids can be connected is usually set by an appropriate device. In particular the voltage can be varied as a function of a temperature of the transmission. This adaptation is usually based on the assumption that all the solenoids are similarly constructed and in particular that they are exposed to the same temperature.

DE 10 2011 114 616 A1 concerns a device for the control of inductive loads. In this case respectively different control devices are assigned to a switching process and a holding process of a load.

However, solenoids are not always exposed to the same conditions and can have different characteristics. Thus, the switching behavior of the valve can deviate from an expected behavior so that the control of the transmission may be less precise.

SUMMARY OF THE INVENTION

A purpose of the present invention is to indicate a technique by means of which better control of a plurality of inductive loads, for example in a transmission control system, can be achieved. The invention achieves this objective by virtue of the objects of the independent claims. The subordinate claims describe preferred embodiments.

A method for operating a plurality of inductive loads that can be connected in parallel with one another between two terminals, to which a controllable voltage is applied, comprises the steps of detecting the connection of a hitherto non-energized load to the terminals; setting the voltage at a predetermined first value; and adjusting the voltage to a predetermined second value after the lapse of a predetermined time interval, the second value being lower than the first value.

By virtue of the temporary voltage elevation the previously non-energized load that is, or is to be connected, is brought into operation more effectively. In particular the build-up of a current flowing through the inductive load can be accelerated. If the inductive load comprises a solenoid, the solenoid can build up a magnetic field in a short time, which can in particular exert a force on an armature. A control process by means of the solenoid and the armature can therefore take place more rapidly and more reproducibly. The armature can act, for example, on a pneumatic valve, a hydraulic valve or a mechanical actuator. Preferably, the solenoid and the armature are arranged in a transmission, particularly a transmission in a utility vehicle. The dynamics of the control can be variable and the ability of the load to be controlled or regulated can be improved. The method can be implemented by means of a known control device for a plurality of loads connected mutually parallel with one another.

By reducing the voltage to the second predetermined value an excessive flow of current through one of the loads can be avoided. Consequently, an excessive voltage drop across the loads can be avoided, which can damage the load to the point of functional failure. Furthermore a drop of efficiency, an elevation of the temperature of the load or an element thermally coupled to it, a reduction of the life of the load or a limitation of its function by some monitoring device can be prevented.

The invention is based on the recognition that although a load which is already carrying a current, i.e. which is therefore already connected to the terminals so that a current is flowing through it, is excited to a larger current flow by the temporarily elevated voltage, its time variation is less pronounced than in the load previously carrying no current. To put it differently, a load already operated at the voltage can be operated further without damage and at the same time a higher current can be passed through a connected load in order to improve its response behavior.

It is also preferable for the method to include an adjustment of the voltage to a predetermined third value after a further predetermined time interval, this third value being lower than the second value. In particular the third value can be chosen such that in an inductive load having a solenoid with an armature, the already attracted armature is held in place. The current flowing for this is smaller than a current required to attract an armature that has moved away when the load or solenoid is not energized. Thus, in this embodiment three different voltages can be produced, that correspond to different phases of the switching on of a load which, in particular, can comprise a solenoid with an armature. The three phases can be called the boost phase (first voltage), the peak phase (second voltage) and the holding phase (third voltage).

It is also preferable that in relation to a number of loads to be switched on at time intervals, the voltage is always set to the highest of the values concerned. If a load is switched on at any arbitrary time-point and starting from an arbitrary voltage, the voltage can be increased to the first value. If now a further load is to be switched on before the predetermined time interval after which the voltage should be reduced to the second value has elapsed, then the first voltage can be kept at the first value. The predetermined time interval can then be measured from the moment when the further load is switched on. In this case the voltage is only reduced when no switch-on process of another of the loads connected in parallel precludes it. Corresponding behavior can be produced if a load is to be switched on during a waiting time interval which lapses before the voltage should be reduced to the third value. In another embodiment it is also possible to prevent the first value from remaining set for longer than a predetermined time due to the re-triggering described. This can prevent overloading of the load.

It is also preferable for the voltage to be reduced to a fourth predetermined value which is lower than the third predetermined value when no load is connected to the terminals. In particular the fourth value can be zero, so that the voltage is switched off when no load is connected. A control device for applying the controlled voltage at the terminals can thereby be treated with greater care and electrical energy can be saved.

Preferably, at least one of the values is determined on the basis of an electrical resistance connected between the terminals. In this way the operating conditions of one or more inductive loads can be reacted to more effectively.

In a particularly preferred embodiment the electrical resistance is determined on the basis of the voltage applied at the terminals and a current flowing through the terminals. In this way, by means of two simple measurements the electrical resistance of the loads connected in parallel between the terminals can be determined. There is no need to determine currents flowing individually through the loads. In other embodiments the resistance across the terminals can also be determined, for example, on the basis of a temperature measurement and a known relationship between the electrical resistance of a load and the temperature. For a plurality of loads individual temperatures can be determined or the same temperature can be used. The resistance of a plurality of connected loads is preferably determined in accordance with Kirchhoff's law for resistances connected in parallel.

A method for operating an inductive load that can be connected between two terminals, to which a controllable voltage is applied, comprises steps of detecting the connection of the previously non-energized load at the terminals; the setting of the voltage to a predetermined first value; the adjustment of the voltage to a predetermined second value after the lapse of a predetermined time interval, such that the second value is lower than the first value; and the adjustment of the voltage to a third value after a further predetermined time interval, such that the third value is lower than the second value.

By using three different voltages in the three time phases, it is possible to achieve faster energizing of the previously non-energized inductive load during the first phase, more secure maintenance of the energizing during the second phase, and energy-saving maintenance of a reduced energization level. Particularly when the inductive load produces a magnetic field which moves a magnetic armature, the phases can be so matched in time that, for example, in the first phase the armature is attracted from a greater distance, in the second phase from a smaller distance, and in the third phase the already fully attracted armature is held in position with lower energy consumption.

A device for operating a plurality of switchable inductive loads connected between two terminals comprises a half-bridge for applying a predetermined voltage between the terminals; and a control device designed to control the half-bridge in such manner that it applies a predetermined voltage between the terminals. The loads can be connected in parallel with one another between the two terminals. In addition, the control device is designed to set the voltage between the terminals to a predetermined first value when a previously non-energized load is connected between the terminals, and after the lapse of a predetermined time interval, to reduce the voltage to a second value lower than the first value.

Basically, the device can be a known device which, for example, adjusts the voltage at the terminals on the basis of a temperature of one of the loads. By designing the control device in the manner described, the above-described method can be implemented and its advantages realized. The features of the method and the device can correspondingly be reciprocally combined with one another.

In particular, the control device can also be designed to reduce the voltage between the terminals after a further predetermined time interval, from the second value to a third value which is lower than the second value.

The half-bridge preferably comprises a first current control valve for connecting the first terminal to a high potential of an intermediate circuit voltage and a second current control valve for connecting the first terminal to a low potential of the intermediate circuit voltage. In this case the control device is preferably designed to actuate the current control valves alternately in order to set the predetermined voltage. Together with a control logic the half-bridge can be integrated in one assembly. For example, the control logic can adjust or regulate the voltage as a function of a specification, carry out a dead-time compensation for the current control valves or detect a defect situation such as a short-circuit of one of the terminals to one of the potentials. In an embodiment, a plurality of half-bridges are integrated with one another in one component. For example, two or three half-bridges can be provided and the component can be designed to control a direct-current motor or a brushless electric motor.

A device for operating a switchable inductive load between two terminals comprises a half-bridge for applying a predetermined voltage between the terminals and a control device designed to actuate the half-bridge in such manner that a predetermined voltage is applied between the terminals. The control device is designed to set the voltage between the terminals to a predetermined first value when a previously non-energized load is connected between the terminals, then, after the lapse of a predetermined time interval, to reduce the voltage to a second value lower than the first value, and after the lapse of a further predetermined time interval to reduce the voltage from the second to a third value which is lower than the second value.

BRIEF DESCRIPTION OF THE DRAWINGS

The invention will now be described in more detail with reference to the attached figures, which show.

DETAILED DESCRIPTION OF THE PREFERRED EMBODIMENTS

Figure 1:
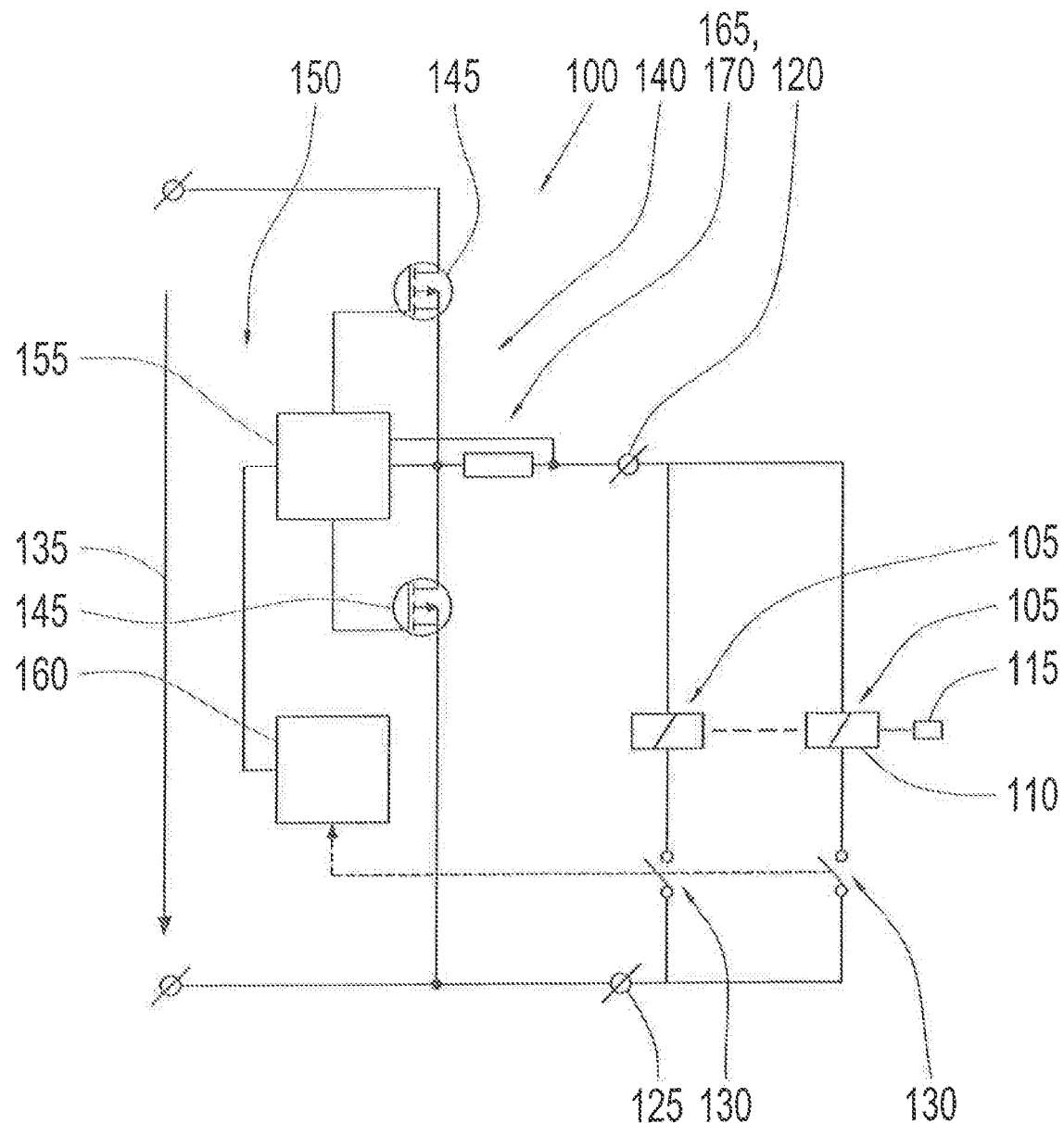
FIG. 1: A device for the control of inductive loads.

FIG. 1 shows a device 100 for controlling one or more inductive loads 105. A load preferably comprises a solenoid 110 and optionally an armature 115. When current flows the armature 115 can be moved by the solenoid 110 in order to bring about a mechanical actuation for example of a valve or some other device. In particular, the load 105 can be designed to control an actuator in a transmission or a clutch, especially in a utility vehicle. For this purpose the armature 115 can in particular actuate a pneumatic or hydraulic valve which controls a flow of fluid from or to a pneumatic or hydraulic actuator for actuating an element of the transmission.

A plurality of loads 105 that are connected in parallel can be operated by a voltage applied between a first terminal 120 and a second terminal 125 of the device 100. The loads each comprise an inductive component and therefore behave as solenoids or as a combination of a solenoid and a resistor. To switch a load 105 on or off an associated switch 130 can be provided, which in the embodiment shown is in each case provided between the load 105 and the second terminal 125 ("low side"). The switches 130 can in each case be provided at other points, in particular between the load 105 and the first terminal 120 ("high side"). In an embodiment up to seven loads 105 parallel with one another can be operated. It is also possible to form a number of groups of parallel-connected loads 105, such that each group is associated with its own voltage control and is preferably configured in accordance with the device 100 illustrated and described here.

The device 100 is preferably operated at an intermediate circuit voltage 135, which can correspond to the voltage of the on-board electrical system of a vehicle and in an embodiment is equal to around 12 V or around 24 V. The intermediate circuit voltage can usually be regarded as constant. By way of a half-bridge 140 the first terminal 120 can alternatively be connected to a high or a low potential of the intermediate circuit voltage 135, so that a predetermined voltage is set at it. For this switching task the half-bridge 140 has two current control valves 145 which can be actuated in alternation, whereby a duty cycle of the control times can influence the voltage at the first terminal 120. The current control valves can in particular be in the form of a semiconductor, possibly an FET, MOSFET, IGBT, thyristor or triac.

To actuate the current control valve, a control device 150 is preferably provided, which in this embodiment comprises a driver 155 and a processing device 160 separate from the driver. The driver 155 and the processing device 160 can even be made integrally with one another. The processing device 160 preferably comprises a programmable microcomputer or microcontroller or an FPGA. The driver 155 is preferably designed automatically to apply and preferably also to maintain a voltage at the first terminal 120 as a function of a signal from the processing device 160, in that in each case it actuates the current control valves 145 appropriately. In particular the driver 155 can be designed to comply with a demand to set the voltage at the first terminal 120 to a predetermined first or second value and even to a third or fourth value.

As will be described in still more detail below, in this case the first value is preferably higher than the second value, which in turn is higher than the third, which is higher than the fourth value. The voltage at the first terminal 120 can be influenced as a function of a total electrical resistance between the terminals 120 and 125. For this, the driver 155 can comprise a sampling device 165 for voltage and/or a sampling device 170 for current at the first terminal 120. The second terminal 125 preferably has a predetermined potential relative to the intermediate circuit voltage 135. In particular, the second terminal 125 can be connected to one of the potentials of the intermediate circuit voltage 135, in the representation shown in FIG. 1 with the low potential.

The processing device 160 can be connected to the switches 130 of the loads 105, in order to determine that a load 105 is or should be switched on. In a further embodiment the processing device 160 can also receive a logic signal representing a demand to switch on a load 105 and thereupon actuate a corresponding switch 130. The switches can in particular be made in the form of electrically actuated current control valves.

It is proposed to design the control device 160 so that it increases the voltage applied between the terminals 120 and 125 temporarily to a first value when, in particular, a previously non-energized load 105 is connected to the terminals 120, 125. Thereafter the voltage should be reduced after a predetermined waiting time to a second value and optionally, after a further predetermined waiting time, to a third value.

Figure 2:
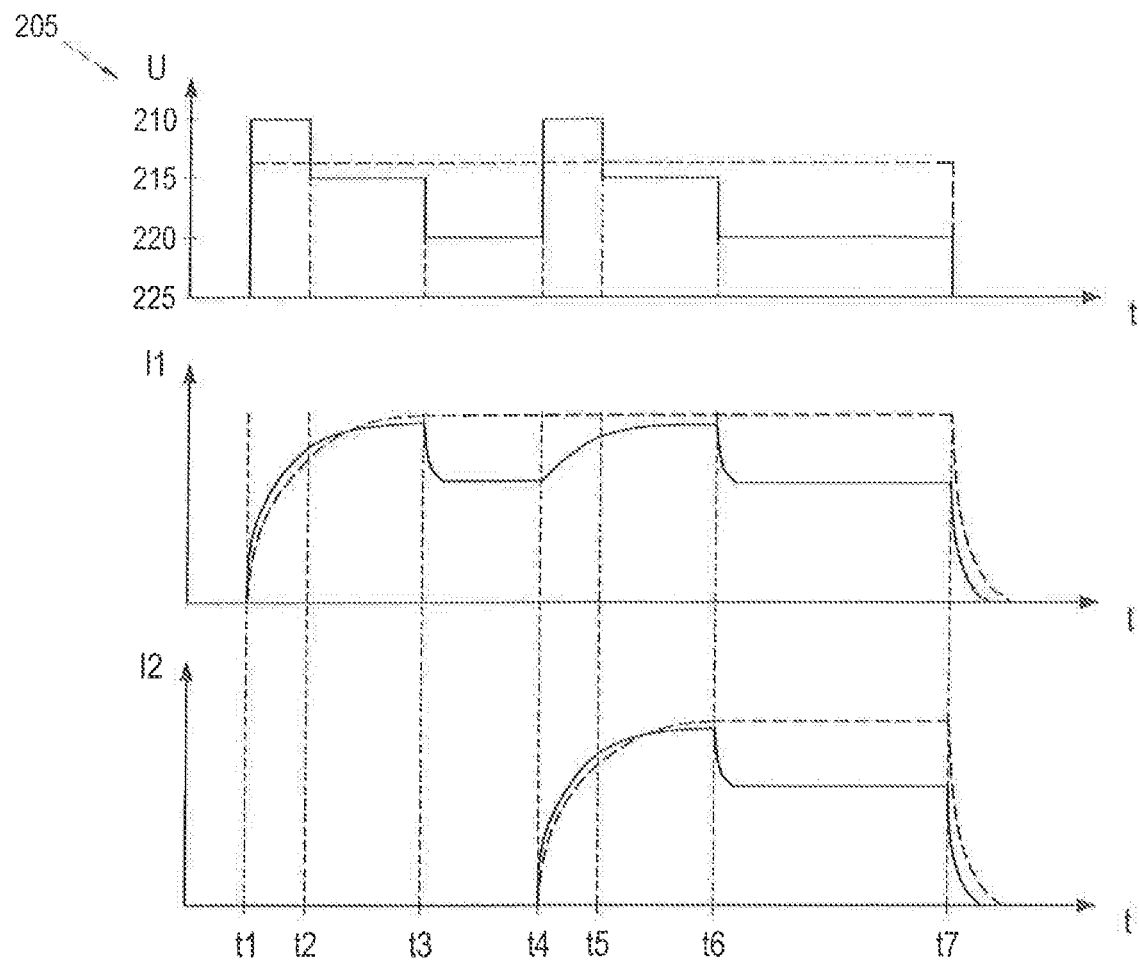
FIG. 2: Time sequences in inductive loads.

FIG. 2 shows time variations at the inductive loads 105 of the example device shown in FIG. 1. These are examples and not necessarily true-to-scale representations. In the horizontal direction is plotted the time and in the vertical direction, in the top diagram a voltage 205 between the terminals 120 and 125, in the middle diagram a current through a first load 105, and in the bottom diagram a current through a second load 105. In this case the loads 105 are chosen as examples and preferably have the same inductances or electrical resistances. For purposes of comparison, broken lines in the diagrams represent in each case a known technique in which the voltage between the terminals 120 and 125 is constant.

It is proposed that the voltage 205 can be set to a first value 210 and then adjusted to a second value 215. It is also preferable for the voltage 205 to be able to be adjusted to a third value 220 and, still more preferably, to a fourth value 225. As already described earlier, in this it is preferable for the first value 210 to be higher than the second value 215, which is higher than the third value 220 which, in turn, is higher than the fourth value 225.

At time T1 the first load 105 is connected. At this point the voltage 205 is set to the first value 210 in order to facilitate the quickest possible build-up of the current through the first load 105. After a predetermined interval or waiting time, at a time T2 the voltage 205 is reduced to the second value 215. The current through the first load 105 continues increasing and approaches a predetermined value asymptotically. After a further predetermined interval, at a time T3 the voltage 205 is preferably reduced to the third value 220. Thereupon, the current flowing through the first load 105 falls to a lower value, which for example is sufficient to keep the armature 115 in an attracted position relative to the solenoid 110. If no load 105 is switched on or off, the voltage 205 can remain at that value.

At a time T4 the second load 105 is switched on. For this the voltage 205 is again increased to the first value 210. The current through the second load 105 follows the same curve as the current through the first load 105 after time T1, but the current through the already connected, first load 105 increases more slowly. The greater the difference between the energizing level of the solenoid 110 and the voltage 205, the more rapidly does the increasing current through the solenoid 110 rise. Since the first load 105 is already energized at the third value 220, the change of the current flowing through it is substantially smaller than that of the second load 105, which at time T4 is not energized.

After the first predetermined waiting time, at a time T5 the voltage 205 is again reduced to the second value 215. At a time T6, following a further predetermined waiting interval there is a further reduction to the third value 220.

At a time T7 both loads are switched off by disconnecting them from at least one of the terminals 120, 125 of the device 100, in particular by means of an associated switch 130. The currents flowing through the loads 105 fall at first rapidly and then more slowly to zero. The same effect can be produced by reducing the voltage 205 to the fourth value 225.

Figure 3:
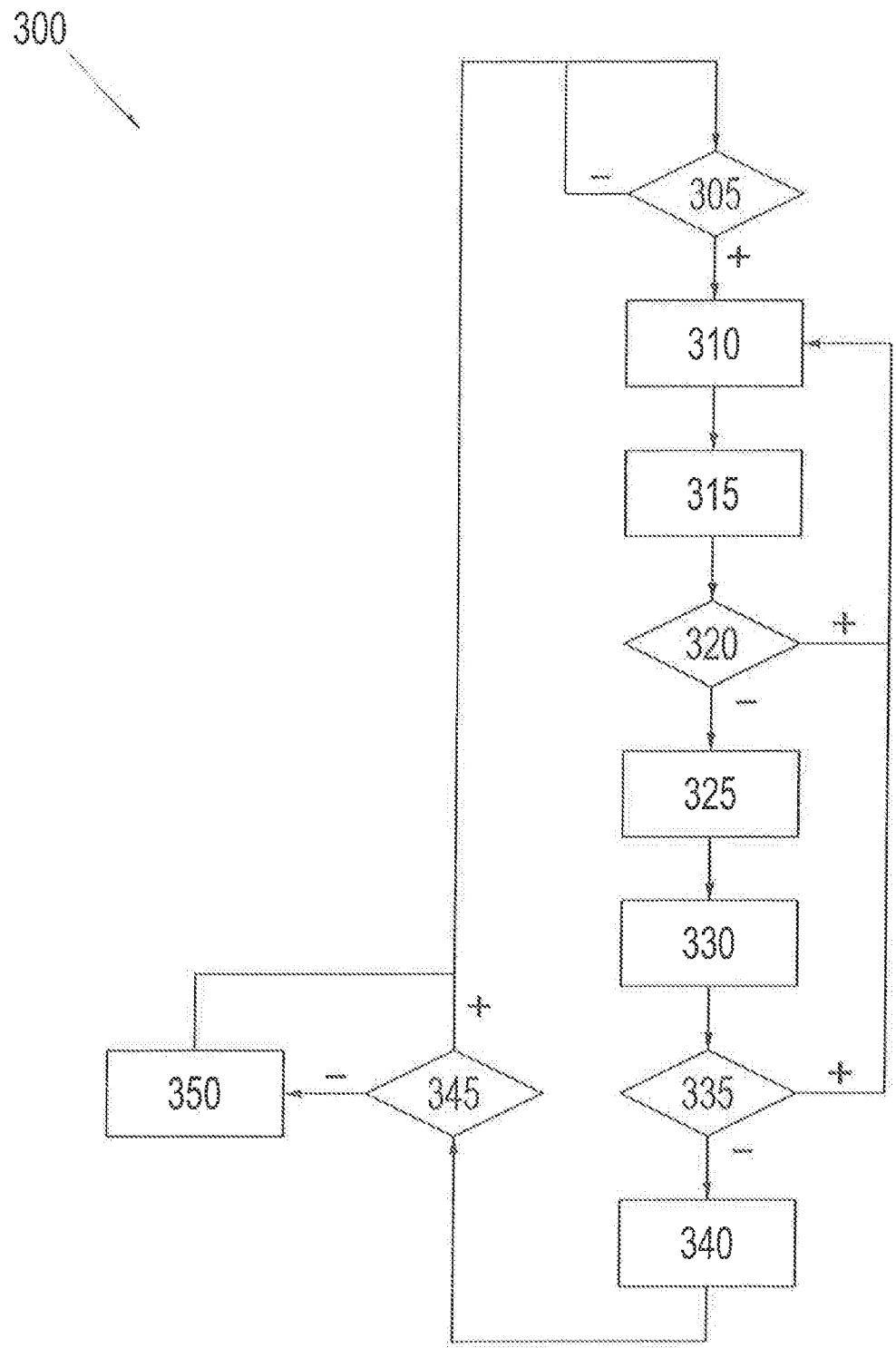
FIGS. 3 and 4: In each case a method for controlling inductive loads.

FIG. 3 shows a first method 300 for controlling inductive loads 105, in particular by means of the device 100 of FIG. 1. The method 300 can be carried out at least in part by the control device 150 or the processing device 160. For this, the method 300 can be presented in the form of a computer program product with program coding means.

In a step 305 it is checked whether a previously non-energized load has been or is to be connected to the terminals 120, 125 of the device 100. If this is not the case, the step 305 can be repeated as often as desired. Otherwise, in a step 310 the voltage at the terminals 120, 125 is set to the first value 210. Then, in a third step 315 a predetermined time interval is allowed to pass. While waiting, in a step 320 it can be checked whether in the meantime a further previously non-energized load 105 is to be or has been connected. If so, the method 300 can revert to step 310. Otherwise, after the lapse of the predetermined waiting interval the voltage 205 is reduced in a step 325 to the second value 215. In a step 330 a further predetermined waiting interval can be allowed to pass and while waiting, in a step 335 it is checked whether meanwhile yet another non-energized load 105 has been or is to be connected. If so, the method 300 can again revert to step 310. Otherwise, once the waiting interval of step 330 has lapsed the voltage 205 can be reduced in a step 340 to the third value 220. In another embodiment it can be checked cyclically in a step 345, particularly after the step 330 or the step 340, whether any load 105 at all is connected to the terminals 120 and 125. If not, then in a step 350 the voltage 205 can be reduced to the fourth value 225, which in particular can be equal to zero. Thereafter or if there is a connected load 105, the method 300 preferably reverts to step 305.

In another embodiment, in step 310 it can be determined whether the first value 210 has lasted longer than a predetermined time in total. If so, then to avoid overloading all the connected loads 105 the voltage 205 can be reduced for example to the second value 215.

Figure 4:
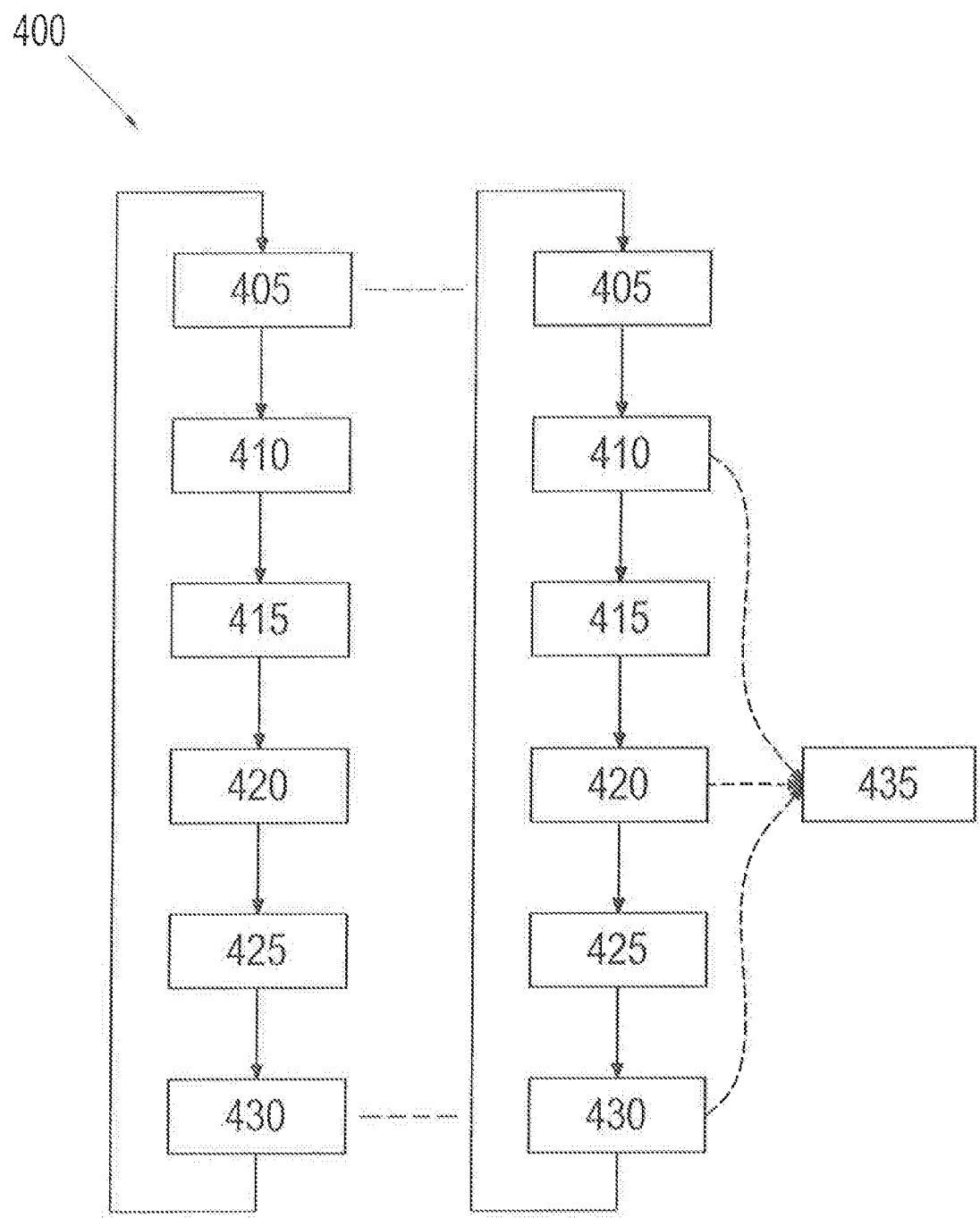

FIG. 4 shows a second method 400 for the control of inductive loads 105, as an alternative to the method 300. In the method 400, with each load 105 that is switched on there is preferably associated, statically or dynamically, a subroutine 405 to 430 of its own. In step 405 it is determined that a previously non-energized load 105 has been or is to be switched on. In a step 410 the first voltage value 210 is thereupon called for. After a predetermined waiting time in a step 415, in a step 420 the second voltage value 215 is called for. Optionally, after a further predetermined waiting time in a step 425, the third voltage value 220 is called for in a step 430. Thereafter, the subroutine preferably reverts to step 405.

In a step 435 the demands for the voltage values 210, 215 and 220 are received. Finally, that voltage value 210, 215 or 220 which is highest is applied at the terminals 120, 125. In another embodiment a similar but longer-lasting change of the first voltage value 210 than described above with reference to FIG. 3 can be provided for. Furthermore, an additional reduction of the voltage 205 to the fourth value 225 can be provided for as described above.

INDEXES

100 Device
105 Load
110 Solenoid
115 Armature
120 First terminal
125 Second terminal
130 Switch
135 Intermediate circuit voltage
140 Half-bridge
145 Current control valve
150 Control device
155 Driver
160 Processing device
165 Sampling device for voltage
170 Sampling device for current
205 Voltage
210 First value
215 Second value
220 Third value
225 Fourth value
300 First method
305 Switch on load?
310 Set voltage to first value
315 Wait
320 Switch on load?
325 Set voltage to second value
330 Wait
335 Switch on load?
340 Set voltage to third value
345 No load switched on?
350 Set voltage to fourth value
400 Second method
405 Switch on load
410 Call for first voltage value
415 Wait
420 Call for second voltage value
425 Wait
430 Call for third voltage value
435 Set highest voltage value called for

The invention claimed is:

1. A method of operating a plurality of inductive loads, which can be connected parallel to one another between first and second terminals, to which a controllable voltage is applied, the method comprising:
   detecting a connection of a previously non-energized load to the terminals;
   setting the voltage to a predetermined first value;
   adjusting the voltage, after lapse of a first predetermined time interval, to a predetermined second value, with the second value being lower than the first value; and
   determining one of the first and the second values on a basis of an electrical resistance between the terminals.

2. The method according to claim 1, further comprising adjusting the voltage, after a further predetermined time interval, to a predetermined third value with the third value being lower than the second value.

3. The method according to claim 1, further comprising, in relation to a plurality of loads switched on at intervals, always setting the voltage to a highest of the first and the second values.

4. The method according to claim 2, further comprising, if no load is connected to the terminals, reducing the voltage to a fourth predetermined value which is lower than the third predetermined value.

5. The method according to claim 1, further comprising determining the electrical resistance on a basis of the voltage applied at the terminals and a current flowing through the terminals.

6. A method of operating an inductive load which can be connected between first and second terminals to which a controllable voltage is applied; the method comprising:
   detecting a connection of a previously non-energized load to the terminals;
   setting the voltage to a predetermined first value;
   adjusting the voltage, after lapse of a first predetermined time interval, to a predetermined second value, with the second value being lower than the first value;

adjusting the voltage, after a further predetermined time interval, to a third value, with the third value being lower than the second value; and determining one of the first and the second values on a basis of an electrical resistance between the terminals.

7. A device for operation of a plurality of switchable inductive loads between first and second terminals, the device comprising:

a half-bridge for applying a predetermined voltage between the terminals;

a control device being designed for controlling the half-bridge such that a predetermined voltage is applied between the terminals;

the loads being connectable in parallel with one another between the first and the second terminals; and the control device being designed to set the voltage between the terminals to a predetermined first value, when a previously non-energized load is connected between the terminals, and, after lapse of a predetermined time interval, to reduce the voltage to a predetermined second value which is lower than the first value.

8. The device according to claim 7, wherein the control device is also designed to reduce the voltage between the terminals, after the lapse of a further predetermined time interval, from the second value to a third value in which the third value is lower than the second value.

9. The device according to claim 7, wherein the half-bridge comprises a first current control valve for connecting the first terminal to a high potential of an intermediate circuit voltage and a second current control valve for connecting the first terminal to a low potential of the intermediate circuit voltage (135), and the control device is designed to actuate the first and the second current control valves by turns in order to set the predetermined voltage.

10. A device for operating a switchable inductive load between first and second terminals, the device comprising:

a half-bridge for applying a predetermined voltage between the terminals;

a control device designed for actuating the half-bridge in such manner that a predetermined voltage is set between the terminals; and the control device is designed to set the voltage between the terminals to a predetermined first value, when a previously non-energized load is connected between the terminals, and, after lapse of a predetermined time interval, to reduce the voltage to a predetermined second value which is lower than the first value, and, after lapse of a further predetermined time interval, to reduce the voltage from the second value to a third value in which the third value is lower than the second value.

* * * * *